United States Patent
Wang et al.

(10) Patent No.: US 11,509,749 B2
(45) Date of Patent: Nov. 22, 2022

(54) DATA PROCESSING METHOD AND APPARATUS, AND COMPUTER

(71) Applicant: HUAWEI TECHNOLOGIES CO., LTD., Shenzhen (CN)

(72) Inventors: Liang Wang, Shenzhen (CN); Xiaoping Fan, Shanghai (CN); Xu Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 321 days.

(21) Appl. No.: 16/839,973

(22) Filed: Apr. 3, 2020

(65) Prior Publication Data

US 2020/0236201 A1    Jul. 23, 2020

Related U.S. Application Data

(63) Continuation of application No. PCT/CN2018/112860, filed on Oct. 31, 2018.

(30) Foreign Application Priority Data

Oct. 31, 2017   (CN) .......................... 201711055014.3

(51) Int. Cl.
*H04L 69/12*     (2022.01)
*H04L 69/16*     (2022.01)
(Continued)

(52) U.S. Cl.
CPC ............ *H04L 69/16* (2013.01); *H04L 5/0055* (2013.01); *H04L 69/12* (2013.01); *H04W 76/27* (2018.02); *H04W 80/06* (2013.01)

(58) Field of Classification Search
CPC ..... H04L 5/0055; H04L 47/193; H04L 69/12; H04L 69/16; H04W 76/27; H04W 80/06
See application file for complete search history.

(56) References Cited

U.S. PATENT DOCUMENTS 9,379,973 B2    6/2016   Mekkattuparamban et al.
2013/0114410 A1  5/2013  Nagato
(Continued)

FOREIGN PATENT DOCUMENTS

CN    101179564 A    5/2008
CN    101547198 A    9/2009
(Continued)

OTHER PUBLICATIONS

Masoud Moshref et al: "Flow-level state transition as a new switch primitive for SON", Hot Topics in Software Defined Networking, ACM, 2 Penn Plaza, Suite 701 New York NY 10121-0701 USA, Aug. 22, 2014(Aug. 22, 2014), pp. 61-66, XP058053574.
(Continued)

*Primary Examiner* — Brian P Cox
(74) *Attorney, Agent, or Firm* — Hauptman Ham, LLP

(57) ABSTRACT

A method includes extracting packet information of a data packet to be transmitted through a Transmission Control Protocol (TCP) connection. If the packet information does not match information in a first data flow table, a first compliance detection is performed on the data packet. A state machine of the TCP connection is obtained if the first compliance detection is successful. The method also includes recording the packet information in the first data flow table, recording a connection status of the TCP connection in a first connection tracking table, and sending the data packet to a receiving end of the TCP connection. If the packet information matches the information in the first data flow table, a second compliance detection is performed on the data packet and, if the second compliance detection fails, the connection status of the TCP connection is adjusted and the data packet is discarded.

20 Claims, 4 Drawing Sheets

(51) Int. Cl.
*H04W 80/06* (2009.01)
*H04W 76/27* (2018.01)
*H04L 5/00* (2006.01)

(56) References Cited

U.S. PATENT DOCUMENTS

| 2014/0226661 A1 | 8/2014 | Mekkattuparamban et al. |
| 2015/0264067 A1 | 9/2015 | Kim et al. |

FOREIGN PATENT DOCUMENTS

| CN | 101635639 A | 1/2010 | | |
| CN | 101674193 A | 3/2010 | | |
| CN | 103152239 A | 6/2013 | | |
| CN | 103259880 A | 8/2013 | | |
| CN | 104104561 A | 10/2014 | | |
| CN | 104243631 A | 12/2014 | | |
| CN | 106656815 A | 5/2017 | | |
| GB | 2542373 A | 3/2017 | | |
| KR | 20080083827 A | * | 3/2007 | ........... G06F 9/4416 |

OTHER PUBLICATIONS

Extended European Search Report issued in corresponding European Patent Application No. 18874488.2, dated Sep. 30, 2020, Munich, Germany.
International search report dated Dec. 19, 2018 from corresponding application No. PCT/CN2018/112860.
Office Action dated Dec. 4, 2019 from corresponding application No. CN 201711055014.3.

* cited by examiner

DATA PROCESSING METHOD AND APPARATUS, AND COMPUTER

CROSS-REFERENCE TO RELATED APPLICATIONS

This application is a continuation of International Application No. PCT/CN2018/112860, filed on Oct. 31, 2018, which claims priority to Chinese Patent Application No. 201711055014.3, filed on Oct. 31, 2017. The disclosures of the aforementioned applications are hereby incorporated by reference in their entireties.

TECHNICAL FIELD

This description relates to the field of computer technologies, and in particular, to a data processing method and apparatus, and a computer.

BACKGROUND

Connection tracking refers to track and record of a connection status of a connection. The connection may be a connection between two physical devices or a connection between two virtual machines. The connection status is used to indicate whether the connection can be used to transmit data. Forwarding efficiency of a data packet can be improved through connection tracking. For example, a computer receives a data packet A, detects a connection status corresponding to a connection for forwarding the data packet A, and records the connection status of the connection. Then, if receiving a data packet B that needs to be transmitted through the connection, the computer may directly determine, based on the recorded connection status of the connection, whether to forward the data packet B, with no need to detect the connection status of the connection again.

In an Open vSwitch (OVS) system, connection tracking is an important function in a Linux kernel protocol stack, and is a basis for implementing network address translation (NAT) and a stateful firewall. Based on the connection tracking, many extension functions for the Linux kernel protocol stack, such as user identification and application identification, may further be implemented. Therefore, connection tracking is important for OVS systems.

In OVS systems, a network interface card and an OVS maintain a same connection tracking table. The connection tracking table is used to record a connection status of each connection. In practice, a connection tracking table of a physical network interface card or an OVS is continually synchronously updated. Connection tracking usually causes a large quantity of CPU and I/O resources of a device to be consumed.

SUMMARY

This description relates to a data processing method and apparatus, and a computer, to reduce consumption of CPU and I/O resources of a device.

According to a first aspect, a data processing method is applied to a computer. The computer includes a physical network interface card and an OVS. The method includes: extracting, by the physical network interface card, packet information of a data packet to be currently transmitted through a Transmission Control Protocol (TCP) connection; performing, by the OVS, compliance detection on the data packet when the packet information does not match information in a first data flow table of the physical network interface card; obtaining, by the OVS, a state machine of the TCP connection if the detection succeeds; when the state machine of the TCP connection is in a steady state, recording, by the physical network interface card, the packet information in the first data flow table, and recording a connection status of the TCP connection as a valid connection state in a first connection tracking table of the physical network interface card; sending, by the physical network interface card, the data packet to a receive end of the TCP connection; performing, by the physical network interface card, compliance detection on the data packet if the packet information matches the information in the first data flow table; and if the detection fails, adjusting, by the physical network interface card, the connection status of the TCP connection in the first connection tracking table to an invalid connection state, and discarding the data packet.

The compliance detection is used to detect whether the data packet satisfies a specified condition.

In the technical solution, when the packet information does not match the first data flow table of the physical network interface card, the OVS can perform compliance detection on the data packet, to improve data packet transmission security. Compared with a connection tracking mechanism in which a first connection tracking table is continually updated based on a change of a state machine of a TCP connection, in some embodiments, when the state machine is in the steady state, the physical network interface card may record the connection status of the TCP connection in the first connection tracking table. This can reduce a quantity of times that the physical network interface card updates the first connection tracking table, thereby reducing consumption of CPU and I/O resources of the computer. When the packet information matches a packet in the first data flow table, the physical network interface card performs compliance detection on the data packet. When the detection succeeds, the physical network interface card sets the connection status of the TCP connection in the first connection tracking table to the invalid connection state, and the OVS does not need to adjust the connection status of the TCP connection. This can reduce a quantity of times that the OVS adjusts the connection status of the TCP connection, thereby reducing consumption of CPU and I/O resources of the computer. In addition, compared with implementing a connection tracking mechanism through software, in some embodiments, connection tracking is implemented by coordinating software (the OVS) with hardware (the physical network interface card). This can improve connection tracking efficiency and further improve data packet forwarding efficiency. Compared with implementing a connection tracking mechanism through hardware, in some embodiments, connection tracking is implemented by coordinating the software with the hardware. This can reduce complexity of processing data by the hardware.

In an optional implementation, the OVS sets the connection status of the TCP connection based on the state machine of the TCP connection, records the connection status of the TCP connection in a second connection tracking table of the OVS, and records the packet information in a second data flow table of the OVS.

In the technical solution, when the state machine of the TCP connection is not in the steady state, only the OVS sets the connection status of the TCP connection based on the state machine of the TCP connection, records the connection status of the TCP connection in the second connection tracking table of the OVS, and records the packet information in the second data flow table of the OVS, and the physical network interface card does not need to synchronize the connection status of the TCP connection recorded in the OVS. This can reduce consumption of CPU and I/O resources of the computer.

In an optional implementation, the physical network interface card sets an aging time length for the connection status of the TCP connection. If a time length within which the connection status of the TCP connection is a target connection status is greater than the aging time length, the physical network interface card deletes the connection status of the TCP connection that is recorded in the first connection tracking table, and deletes the packet information that is carried in the data packet and recorded in the first data flow table, and the OVS deletes the connection status of the TCP connection that is recorded in the second connection tracking table, and deletes the packet information of the data packet that is recorded in the second data flow table.

The target connection status includes an invalid connection state or a valid connection state.

In the technical solution, the physical network interface card sets the aging time length for the connection status of the TCP connection. In this case, the physical network interface card can maintain the first data flow table and the first connection tracking table based on the aging time length for the connection status of the TCP connection, and the OVS can maintain the second data flow table and the second connection tracking table based on the aging time length for the connection status of the TCP connection, thereby improving connection tracking accuracy and saving memory space.

In an optional implementation, the target connection status includes a valid connection state, and the physical network interface card sets the aging time length for the connection status of the TCP connection based on the state machine of the TCP connection.

In this embodiment, the target connection status includes a valid connection state, and the physical network interface card sets the aging time length for the connection status of the TCP connection based on the state machine of the TCP connection, thereby improving connection tracking accuracy and saving memory space of the computer.

In an optional implementation, the OVS obtains a flag bit carried in the data packet and a flag bit carried in a data packet historically transmitted through the TCP connection. The OVS determines that the connection status of the TCP connection is a steady state if the data packet carries an acknowledgement (ACK) flag and the historically transmitted data packet carries a synchronization (SYN) flag and an ACK flag.

In the technical solution, the OVS can quickly determine, based on the flag bit in the data packet and the flag bit in the historically transmitted data packet, whether the state machine of the TCP connection is in the steady state.

In an optional implementation, performing compliance detection on the data packet by the OVS may include: obtaining flag data carried in the data packet, where the flag data includes a flag bit or a sequence number; and performing compliance detection on the data packet based on the flag data.

In the technical solution, the OVS can quickly perform compliance detection on the data packet based on the flag data in the data packet, to improve data packet transmission security.

In an optional implementation, the flag data is a flag bit, whether the data packet satisfies a first flag bit condition is detected based on the flag bit in the data packet. If it is detected that the flag bit carried in the data packet does not satisfy the first flag bit condition, the OVS uses the data packet as an abnormal data packet, that is, the detection fails, or otherwise, uses the data packet as a compliant data packet, that is, the detection succeeds.

The first flag bit condition is set based on the state machine of the TCP connection.

In the technical solution, the OVS can perform compliance detection on the data packet based on the flag bit carried in the data packet, to improve data packet transmission security.

In an optional implementation, if the flag data includes a sequence number, whether the sequence number carried in the data packet is in a sliding window is detected. If the sequence number is not in the sliding window, the OVS uses the data packet as an abnormal data packet, that is, the detection fails, or otherwise, uses the data packet as a compliant data packet, that is, the detection succeeds.

The sliding window is used to indicate a range of a sequence number in a data packet to be received by the receive end of the TCP connection.

In the technical solution, the OVS can perform compliance detection on the data packet based on the sequence number carried in the data packet, to improve data packet transmission security.

In an optional implementation, performing compliance detection on the data packet by the physical network interface card may include: obtaining flag data carried in the data packet, where the flag data includes a flag bit or a sequence number; and performing compliance detection on the data packet based on the flag data.

In the technical solution, the physical network interface card can quickly perform compliance detection on the data packet based on the flag data in the data packet, to improve data packet transmission security.

In an optional implementation, the flag data is a flag bit, whether the data packet satisfies a second flag bit condition is detected based on the flag bit in the data packet. If it is detected that the flag bit carried in the data packet does not satisfy the second flag bit condition, the physical network interface card uses the data packet as an abnormal data packet, that is, the detection fails, or otherwise, uses the data packet as a compliant data packet, that is, the detection succeeds.

The second flag bit condition is set based on the state machine of the TCP connection.

In the technical solution, the physical network interface card can perform compliance detection on the data packet based on the flag bit carried in the data packet, to improve data packet transmission security.

In an optional implementation, if the flag data includes a sequence number, whether the sequence number carried in the data packet is in a sliding window is detected. If the sequence number is not in the sliding window, the physical network interface card uses the data packet as an abnormal data packet, that is, the detection fails, or otherwise, uses the data packet as a compliant data packet, that is, the detection succeeds.

In the technical solution, the physical network interface card can perform compliance detection on the data packet based on the sequence number carried in the data packet, to improve data packet transmission security.

According to a second aspect, a computer is provided. The computer includes: a memory, configured to store one or more programs; and a processor, configured to invoke the programs stored in the memory, to implement the solution in the method design according to the first aspect.

According to a third aspect, a computer-readable storage medium is provided, and stores a computer program. When being executed by at least one processor, the computer program can implement the first aspect, the possible implementations of the first aspect, and beneficial effects thereof.

According to a fourth aspect, a computer program product includes a non-volatile computer-readable storage medium storing a computer program. When being executed, the computer program enables a computer to perform the steps in the method according to the first aspect. For implementations and beneficial effects of the computer program product for resolving a problem, refer to the first aspect, the possible implementations of the method of the first aspect, and beneficial effects thereof. Repeated parts are not described again.

BRIEF DESCRIPTION OF DRAWINGS

To describe the technical solutions in the discussed embodiments more clearly, the following briefly describes the accompanying drawings required for describing the embodiments.

DESCRIPTION OF EMBODIMENTS

Figure 1:
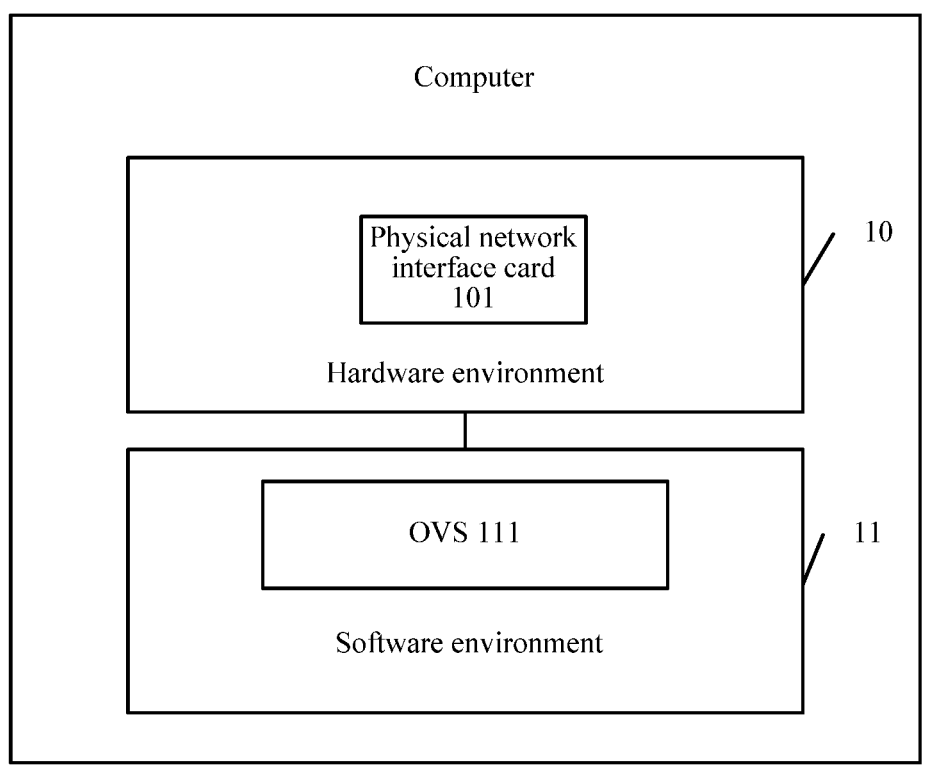
FIG. 1 is a schematic structural diagram of a computer, in accordance with one or more embodiments.

The following clearly describes the technical solutions in the discussed embodiments with reference to the accompanying drawings. The described embodiments are exemplary and additional embodiments are possible.

The technical solutions in the discussed embodiments may be typically applied to a computer, and in some embodiments, to a computer that operates in a cloud computing environment and on which an Open vSwitch (OVS) is installed and a physical network interface card is configured. The computer may be a device such as a server or a cloud host. The OVS may be product-level multi-layer virtual switch software that supports an OpenFlow protocol. The OpenFlow protocol is a standard protocol for communication between a control plane and a forwarding plane of a software defined network (SDN).

In some embodiments, a TCP connection may be a TCP connection between different virtual machines on a same computer or between different virtual machines on different computers, or may be a TCP connection between a virtual machine on a computer and an electronic device in an external network environment, where the electronic device may be a device such as a server or an intelligent terminal.

In some embodiments, a state machine of the TCP connection may be used to indicate a connection status of the TCP connection. The status machine of the TCP connection includes 11 states such as a listen LISTEN state, a SYN-SENT state, a SYN-RECV state, a steady state, a FIN-WAIT-1 state, and a FIN-WAIT-2 state. In addition, the state machine of the TCP connection includes only one state at a moment, and may switch between different states. The LISTEN state is used to indicate that the TCP connection is in a listening state. The SYN-SENT state is used to indicate that a transmit end has sent a request for establishing the TCP connection. The SYN-RECV state is used to indicate that a receive end has received the request for establishing the TCP connection. The steady state is used to indicate that the TCP connection has been established. The FIN-WAIT-1 state is used to indicate that the receive end or the transmit end has sent a request for closing the TCP connection. The FIN-WAIT-2 state is used to indicate that the receive end or the transmit end has received a request for closing the TCP connection.

In some embodiments, that the state machine of the TCP connection is in a steady state means that a three-way handshake has been completed for the TCP connection. The steady state is used to indicate that the TCP connection has been established, that is, may be used to transmit a service data packet.

In the embodiments of the present invention, a first data flow table is a data flow table maintained by a physical network interface card. The first data flow table may include at least one piece of 5-tuple information or information such as flag data (that is, a flag bit or a sequence number) of a data packet. The first data flow table may further include an operation instruction. The operation instruction is used to instruct to process the data packet. For example, the operation instruction is used to instruct to encapsulate the data packet. The first data flow table may be set by a user or a device operator, and may be maintained (updated or deleted) based on a mechanism. The mechanism may be a connection tracking mechanism, or may be another data processing mechanism.

In some embodiments, a first connection tracking table is a connection tracking table maintained by the physical network interface card. The connection tracking table may be used to record that the state machine of the TCP connection is in a steady state and record a connection status existing after the steady state. The connection status may include a valid connection state or an invalid connection state. The connection status of the TCP connection is used to indicate whether the TCP connection can be used to transmit a data packet. That is, the valid connection state means that the TCP connection is a secure connection and can be used to transmit a data packet, and the invalid connection state may mean that the TCP connection is an abnormal connection and cannot be used to transmit a data packet.

In some embodiments, a second data flow table is a data flow table maintained in an OVS. The second data flow table may include 5-tuple information of a data packet or information such as flag data (that is, a flag bit or a sequence number) of a data packet. The OVS may determine the state machine of the TCP connection by querying the second data flow table. For example, it is determined, based on the second data flow table, that a data packet historically transmitted through the TCP connection carries a synchronization (SYN) flag, and a data packet to be currently transmitted through the TCP connection carries a SYN flag and an acknowledgement (ACK) flag. In this case, it may be determined that the state machine of the TCP connection is a SYN RECV state.

In some embodiments, a second connection tracking table is a connection tracking table maintained in the OVS. The connection tracking table may be used to record a connection status existing before the state machine of the TCP connection is in the steady state. The connection status may include an invalid connection state, and the invalid connection state is used to indicate that the TCP connection has not been established.

FIG. 1 is a schematic structural diagram of a computer, in accordance with one or more embodiments. The computer includes a hardware environment 10 and a software environment 11. The hardware environment 10 includes a physical network interface card 101, and the software environment 11 includes an OVS 111. The hardware environment 10 may exchange data with the software environment 11, and connection tracking is implemented by coordinating the software environment 11 with the hardware environment 10 in this embodiment. Specific descriptions are as follows:

(1) The software environment 11 is used for compliance detection and connection tracking.

The OVS 111 of the software environment 11 performs compliance detection on a data packet and performs connection tracking on a TCP connection. If packet information of the data packet does not match information in a first data flow table of the physical network interface card 101, the OVS 111 may determine that a connection status of the TCP connection is not tracked, and the OVS 111 may perform compliance detection on the data packet. If the detection fails, the data packet is used as an abnormal data packet. In other words, the data packet is a malicious attack packet.

To prevent the data packet from maliciously attacking the computer, leading to a crash of an operating system of the computer and the like, the OVS 111 may discard the data packet. If the detection succeeds, the data packet is used as a compliant data packet, and a state machine of the TCP connection is obtained. When the state machine of the TCP connection is not in a steady state, the OVS 111 may determine that the TCP connection has not been established, and set the connection status of the TCP connection based on the state machine of the TCP connection, record the connection status of the TCP connection in a second connection tracking table of the OVS 111, and record the packet information in a second data flow table of the OVS 111, so that the OVS can determine, based on the second data flow table, a data packet historically transmitted through the TCP connection.

The data packet may be a data packet to be currently transmitted through the TCP connection. The TCP connection may be a connection from a source port to a destination port, or may be a connection from a source IP address to a destination IP address.

The packet information may include 5-tuple information and the like. The 5-tuple information may include the source IP address, the source port, the destination IP address, the destination port and a transport layer protocol (for example, the Transmission Control Protocol, TCP).

(2) The hardware environment 10 is used to record connection tracking information.

When the state machine of the TCP connection is in a steady state, the physical network interface card 101 of the hardware environment 10 may determine that the TCP connection has been established and may be used to transmit a data packet, the physical network interface card 101 may record the packet information in the first data flow table, record the connection status of the TCP connection as a valid connection state in the first connection tracking table of the physical network interface card 101, and send the data packet to a receive end of the TCP connection. If a data packet needs to be forwarded next time through the TCP connection, the physical network interface card may query the first data flow table and the first connection tracking table to determine the connection status of the TCP connection, and determine, based on the connection status of the TCP connection, whether to forward the data packet, with no need to send the data packet to the OVS for processing. This can improve data packet forwarding efficiency and reduce consumption of CPU and I/O resources of the computer.

Compared with a connection tracking mechanism in which a first connection tracking table is continually updated based on a change of a state machine, in some embodiments, when the state machine is in the steady state, the physical network interface card 101 records the connection status of the TCP connection in the first connection tracking table. This can reduce a quantity of times that the physical network interface card 101 updates the first connection tracking table, thereby reducing consumption of CPU and I/O resources of the computer.

(3) The hardware environment 10 is further used to maintain the connection tracking information.

The physical network interface card 101 of the hardware environment 10 maintains entries in the first data flow table and the first connection tracking table of the physical network interface card 101, where the maintenance includes adjustment or deletion.

A manner of adjusting an entry in the first connection tracking table of the physical network interface card 101 includes: If the packet information matches information in the first data flow table, the physical network interface card 101 may determine that the TCP connection has been tracked. The physical network interface card 101 may perform compliance detection on the data packet. If the detection fails, the physical network interface card 101 adjusts the connection status of the TCP connection in the first connection tracking table to an invalid connection state, and discards the data packet.

A malicious attacker usually sends a plurality of abnormal data packets. Therefore, when detecting an abnormal data packet, to prevent transmission of the abnormal data packet, the physical network interface card 101 may adjust the connection status of the TCP connection to the invalid connection state, to improve data packet transmission security. Therefore, if the detecting result indicates that the detection fails, the physical network interface card 101 may use the data packet as an abnormal data packet, and query the first connection tracking table for the connection status of the TCP connection. If the status of the TCP connection is a valid connection state, the physical network interface card 101 adjusts the connection status of the TCP connection to the invalid connection state, and discards the data packet. If the status of the TCP connection is an invalid connection state, the physical network interface card 101 does not adjust the connection status of the TCP connection, and discards the data packet.

The physical network interface card 101 may maintain only two connection states (that is, the valid connection state and the invalid connection state) of the TCP connection, and may simplify processing logic of the physical network interface card, in other words, reduce complexity of processing data by hardware. When the physical network interface card adjusts the connection status of the TCP connection, the OVS does not need to synchronously adjust the connection status of the TCP connection. This can reduce consumption of CPU and I/O resources of the computer.

To prevent the TCP connection from occupying system bandwidth resources for a long time or prevent the recorded connection status of the TCP connection from occupying excessive memory space, the physical network interface card 101 may delete some entries in the first data flow table and the first connection tracking table. The physical network interface card 101 sets an aging time length for the connection status of the TCP connection. If a time length within which the connection status of the TCP connection is a target connection status is greater than the aging time length, the physical network interface card 101 determines that an aging time for the connection status of the TCP connection expires, deletes the connection status of the TCP connection that is recorded in the first connection tracking table, and deletes the packet information that is carried in the data packet and recorded in the first data flow table. The physical network interface card 101 may determine, based on the aging time length for the connection status of the TCP connection, whether to delete the connection status of the TCP connection, thereby improving connection tracking accuracy and saving memory resources of the physical network interface card 101.

The target connection status includes an invalid connection state or a valid connection state.

(4) The software environment 11 is further used to delete the connection tracking information.

If the time length within which the connection status of the TCP connection is a target connection status is greater than the aging time length, the OVS 111 deletes the connection status of the TCP connection that is recorded in the second connection tracking table and the packet information of the data packet that is recorded in the second data flow table. The OVS 111 may determine, based on the aging time length for the connection status of the TCP connection, whether to delete the connection status of the TCP connection, thereby improving connection tracking accuracy and saving memory resources of the physical network interface card 101.

It should be noted that in some application scenarios, the OVS 111 and the physical network interface card 101 cannot interact with each other directly. If the OVS 111 or the physical network interface card 101 is modified to implement direct interaction between the OVS 111 and the physical network interface card 101, an application using the OVS 111 or the physical network interface card 101 is affected. For example, some applications cannot be used or performance of some applications is degraded. Therefore, the software environment 11 may further include a user-mode OVS, and the user-mode OVS may be used as an intermediate medium for interaction between the OVS 111 and the physical network interface card 101.

For example, when the OVS 111 detects that the state machine of the TCP connection is in a steady state, the user-mode OVS can instruct the physical network interface card 101 to record the connection status of the TCP connection in the first connection tracking table as a valid connection state. When the physical network interface card 101 detects that the time length within which the connection status of the TCP connection is the target connection status is greater than the aging time length, the user-mode OVS may be used to instruct the OVS 111 to delete the packet information from the second data flow table and to delete the connection status of the TCP connection from the second connection tracking table.

It should be noted that the hardware environment 10 may further include components such as a processor and a memory. The hardware environment may further include at least one virtual machine connected to the OVS.

In this embodiment, when the state machine of the TCP connection is not in the steady state, the software environment performs compliance detection and connection tracking. When the state machine of the TCP connection is in the steady state, the hardware environment records the connection tracking information, and the hardware environment does not need to continually update the connection status of the TCP connection based on a change of the state machine of the TCP connection. This reduces a step of updating the connection status of the TCP connection by the hardware environment, thereby reducing consumption of CPU and I/O resources of the computer. The hardware environment may adjust the connection status of the TCP connection to the invalid connection state when compliance detection on the data packet fails, and the software environment does not need to synchronously adjust the connection status of the TCP connection. This reduces a quantity of times that the software environment adjusts the connection status of the TCP connection, thereby reducing consumption of CPU and I/O resources of the computer.

Based on the descriptions of the computer, some embodiments provide a data processing method, where the method is applied to a computer. The computer includes a physical network interface card and an OVS. The method shown in FIG. 2 may include the following steps.

S201. The physical network interface card extracts packet information of a data packet to be currently transmitted through a Transmission Control Protocol TCP connection.

S202. The physical network interface card determines whether the packet information matches information in a first data flow table of the physical network interface card. If the packet information does not match the information in the first data flow table, step S203 to step S206 are performed. Otherwise, step S207 and step S208 are performed.

In this embodiment, the physical network interface card may determine whether the packet information matches the information in the first data flow table of the physical network interface card; and if the packet information does not match the information in the first data flow table, determine that a connection status of the TCP connection is not tracked, and may perform step S203 to step S206 to perform connection tracking; or otherwise, determine that a connection status of the TCP connection has been tracked, and may perform step S207 and step S208 to query for the recorded connection status of the TCP connection.

S203. The OVS performs compliance detection on the data packet when the packet information does not match the information in the first data flow table of the physical network interface card.

The compliance detection is used to detect whether the data packet satisfies a specified condition.

In this embodiment, when the packet information does not match the information in the first data flow table of the physical network interface card, the OVS may perform compliance detection on the data packet; and if the detection succeeds, may use the data packet as a compliant data packet, and perform step S204; or if the detection fails, may use the data packet as an abnormal data packet, discard the data packet, and terminate this procedure. Data packet transmission security can be improved by performing compliance detection on the data packet.

In an optional implementation, performing compliance detection on the data packet by the OVS may include: obtaining flag data carried in the data packet, where the flag data includes a flag bit or a sequence number; and performing compliance detection on the data packet based on the flag data.

In this embodiment, the OVS can quickly perform compliance detection on the data packet based on the flag data in the data packet, to improve data packet transmission security.

In an optional implementation, the flag data is a flag bit, whether the data packet satisfies a first flag bit condition is detected based on the flag bit in the data packet. If it is detected that the flag bit carried in the data packet does not satisfy the first flag bit condition, the OVS uses the data packet as an abnormal data packet, that is, the detection fails, or otherwise, uses the data packet as a compliant data packet, that is, the detection succeeds.

The first flag bit condition may be set based on a state machine of the TCP connection, or may be set by a user. Because the OVS performs compliance detection on a data packet that is transmitted when and before the state machine of the TCP connection is in a steady state, the data packet transmitted when and before the state machine is in the steady state may carry only at least one of a synchronization (SYN) flag and an ACK flag.

For example, when the state machine of the TCP connection is a SYN-SENT state, that is, when the TCP connection is in a first handshake state, the first flag bit condition is that the data packet needs to carry a SYN flag. If the data packet carries a SYN flag and an ACK flag, it is determined that the data packet is an abnormal data packet, that is, the detection fails. If the data packet carries a SYN flag, it is determined that the data packet is a compliant data packet, that is, the detection succeeds.

In this embodiment, the OVS can perform compliance detection on the data packet based on the flag bit carried in the data packet, to improve data packet transmission security.

In an optional implementation, if the flag data includes a sequence number, whether the sequence number carried in the data packet is in a sliding window is detected. If the sequence number is not in the sliding window, the OVS uses the data packet as an abnormal data packet, that is, the detection fails, or otherwise, uses the data packet as a compliant data packet, that is, the detection succeeds.

The sliding window is used to indicate a range of a sequence number in a data packet to be received by a receive end of the TCP connection. The OVS may set the sliding window based on a memory size of the receive end. The OVS may determine, based on a compliance detection result of the data packet, whether to adjust a size of the sliding window. For example, the sliding window is [50, 1000], and compliance detection is performed on the data packet. When the detection result indicates that the detection succeeds, the sliding window is adjusted to [51, 1000]. When the detection result indicates that the detection fails, the size of the sliding window is not adjusted.

In this embodiment, the OVS can perform compliance detection on the data packet based on the sequence number carried in the data packet, to improve data packet transmission security.

For example, the sliding window is [50, 1000]. If the sequence number in the data packet is 20, the OVS or the physical network interface card may determine that the sequence number is not in the sliding window, and use the data packet as an abnormal data packet, that is, the detection fails. If the sequence number carried in the data packet is 56, the OVS or the physical network interface card may determine that the sequence number is in the sliding window, and use the data packet as a compliant data packet, that is, the detection fails.

S204. The OVS obtains a state machine of the TCP connection if the detection succeeds.

In this embodiment, if the detection succeeds, the OVS may obtain the state machine of the TCP connection based on the flag bit in the data packet and a flag bit in a data packet historically transmitted through the TCP connection.

For example, if the flag bit in the historically transmitted data packet includes a SYN flag, and the flag bit in the data packet includes a SYN flag and an ACK flag, it is determined that the data packet is a data packet in a second handshake, and the state machine of the TCP connection is in a SYN_RECV state.

The historically transmitted data packet may be a data packet transmitted last time through the TCP connection.

S205. When the state machine of the TCP connection is in a steady state, the physical network interface card records the packet information in the first data flow table, and records a connection status of the TCP connection as a valid connection state in a first connection tracking table of the physical network interface card.

In this embodiment, when the state machine of the TCP connection is in the steady state, the physical network interface card may determine that a three-way handshake has been completed for the TCP connection, that is, the TCP connection has been established. The physical network interface card may record the packet information in the first data flow table, and record the connection status of the TCP connection as the valid connection state in the first connection tracking table of the physical network interface card. In this way, when a data packet is transmitted next time, whether to forward the data packet may be determined by querying for the recorded connection status of the TCP connection, thereby improving data packet transmission efficiency. In addition, compared with a connection tracking mechanism in which a first connection tracking table is continually updated based on a change of a state machine, in some embodiments, when the state machine is in the steady state, the physical network interface card may record the connection status of the TCP connection in the first connection tracking table. This can reduce a quantity of times that the physical network interface card updates the first connection tracking table, thereby reducing consumption of CPU and I/O resources of the computer.

S206. The physical network interface card sends the data packet to a receive end of the TCP connection.

S207. The physical network interface card performs compliance detection on the data packet if the packet information matches the information in the first data flow table.

In this embodiment, if the packet information matches the information in the first data flow table, the physical network interface card may perform compliance detection on the data packet; and if the detection fails, perform step S208; or if the detection succeeds, query for the connection status of the connection in the first connection tracking table. If the connection status is an invalid connection state, the physical network interface card discards the data packet. If the connection status is a valid connection state, the physical network interface card sends the data packet to a receive end of the TCP connection.

In an optional implementation, performing compliance detection on the data packet by the physical network interface card may include: obtaining flag data carried in the data packet, where the flag data includes a flag bit or a sequence number; and performing compliance detection on the data packet based on the flag data.

In this embodiment, the physical network interface card can quickly perform compliance detection on the data packet based on the flag data in the data packet, to improve data packet transmission security.

In an optional implementation, the flag data is a flag bit, whether the data packet satisfies a second flag bit condition is detected based on the flag bit in the data packet. If it is detected that the flag bit carried in the data packet does not satisfy the second flag bit condition, the physical network interface card uses the data packet as an abnormal data packet, that is, the detection fails, or otherwise, uses the data packet as a compliant data packet, that is, the detection succeeds.

The second flag bit condition may be set based on a state machine of the TCP connection, or may be set by a user. Because the physical network interface card performs compliance detection on a data packet that is transmitted after the state machine of the TCP connection is in the steady state (that is, after a three-way handshake), the second flag bit condition includes that the data packet needs to carry an ACK flag or a reset RST flag. Alternatively, the second flag bit condition may include that a data packet carrying one of a finish FIN flag, a push PSH flag, or an urgency URG flag needs to carry an ACK flag, or the second flag bit condition may include that the data packet cannot carry a SYN flag.

In this embodiment, the physical network interface card can perform compliance detection on the data packet based on the flag bit carried in the data packet, to improve data packet transmission security.

In an optional implementation, if the flag data includes a sequence number, whether the sequence number carried in the data packet is in a sliding window is detected. If the sequence number is not in the sliding window, the physical network interface card uses the data packet as an abnormal data packet, that is, the detection fails, or otherwise, uses the data packet as a compliant data packet, that is, the detection succeeds.

The sliding window is used to indicate a range of a sequence number in a data packet to be received by the receive end of the TCP connection. The physical network interface card may set the sliding window based on a memory size of the receive end. The physical network interface card may determine, based on a compliance detection result of the data packet, whether to adjust a size of the sliding window. For example, the sliding window is [60, 1000], and compliance detection is performed on the data packet. When the detection result indicates that the detection succeeds, the sliding window is adjusted to [61, 1000]. When the detection result indicates that the detection fails, the size of the sliding window is not adjusted.

In this embodiment, the physical network interface card can perform compliance detection on the data packet based on the sequence number carried in the data packet, to improve data packet transmission security.

S208. If the detection fails, the physical network interface card adjusts a connection status of the TCP connection in a first connection tracking table to an invalid connection state, and discards the data packet.

In this embodiment, when the compliance detection on the data packet fails, and the connection status of the TCP connection recorded in the first connection tracking table is the valid connection state, the physical network interface card may adjust the connection status of the TCP connection to the invalid connection state, and discard the data packet, thereby improving data transmission security. When the compliance detection on the data packet fails, and the connection status of the TCP connection recorded in the first connection tracking table is the invalid connection state, the physical network interface card may discard the data packet without adjusting the connection status of the TCP connection. The physical network interface card may maintain only two connection states (that is, the valid connection state and the invalid connection state) of the TCP connection, and may simplify processing logic of the physical network interface card, in other words, reduce complexity of processing data by hardware. When the physical network interface card adjusts the connection status of the TCP connection, the OVS does not need to synchronously adjust the connection status of the TCP connection. This can reduce consumption of CPU and I/O resources of the computer.

In this embodiment, when the packet information does not match the first data flow table of the physical network interface card, the OVS can perform compliance detection on the data packet, to improve data packet transmission security. Compared with a connection tracking mechanism in which a first connection tracking table is continually updated based on a change of a state machine, in some embodiments, when the state machine of the TCP connection is in the steady state, the physical network interface card may record the connection status of the TCP connection in the first connection tracking table. This can reduce a quantity of times that the physical network interface card updates the first connection tracking table, thereby reducing consumption of CPU and I/O resources of the computer.

When the packet information matches a packet in the first data flow table, the physical network interface card performs compliance detection on the data packet. When the compliance detection on the data packet fails, and the connection status of the TCP connection recorded in the first connection tracking table is the valid connection state, the physical network interface card may adjust the connection status of the TCP connection to the invalid connection state, and discard the data packet. That is, when the physical network interface card adjusts the connection status of the TCP connection, the OVS does not need to synchronously adjust the connection status of the TCP connection. This can reduce a quantity of times that the OVS adjusts the connection status of the TCP connection, thereby reducing consumption of CPU and I/O resources of the computer. In addition, compared with implementing a connection tracking mechanism through software, in some embodiments, connection tracking is implemented by coordinating software (the OVS) with hardware (the physical network interface card). This can improve connection tracking efficiency and further improve data packet forwarding efficiency. Compared with implementing a connection tracking mechanism through hardware, in some embodiments, connection tracking is implemented by coordinating the software with the hardware. This can reduce complexity of processing data by the hardware.

Based on the descriptions of the data processing method, one or more embodiments provide another data processing method, where the method is applied to a computer. The computer includes a physical network interface card and an OVS. The method shown in FIG. 3 may include the following steps.

S301. The physical network interface card extracts packet information of a data packet to be currently transmitted through a Transmission Control Protocol (TCP) connection.

S302. The physical network interface card determines whether the packet information matches information in a first data flow table of the physical network interface card. If the packet information does not match the information in the first data flow table, step S303 to step S307 are performed. Otherwise, step S308 and step S309 are performed.

S303. The OVS performs compliance detection on the data packet when the packet information does not match the information in the first data flow table of the physical network interface card.

S304. If the detection succeeds, the OVS obtains a flag bit carried in the data packet and a flag bit carried in a data packet historically transmitted through the TCP connection.

In this embodiment, the OVS may query a second data flow table of the OVS to obtain the flag bit carried in the data packet historically transmitted through the TCP connection, and may obtain the flag bit of the data packet from a header of the data packet, to determine a state machine of the TCP connection based on the flag bit in the data packet and the flag bit in the historically transmitted data packet.

In an optional implementation, when the state machine of the TCP connection is not in a steady state, the OVS sets a connection status of the TCP connection based on the state machine of the TCP connection, records the connection status of the TCP connection in a second connection tracking table of the OVS, and records the packet information in the second data flow table of the OVS.

In this embodiment, when the state machine of the TCP connection is not in the steady state, the OVS may set the connection status of the TCP connection based on the state machine of the TCP connection, record the connection status of the TCP connection in the second connection tracking table of the OVS, and record the packet information in the second data flow table of the OVS, and the physical network interface card does not need to synchronize the connection status of the TCP connection recorded in the OVS. This can reduce consumption of CPU and I/O resources of the computer.

S305. The OVS determines that a connection status of the TCP connection is a steady state if the data packet carries an acknowledgement (ACK) flag and the historically transmitted data packet carries a synchronization (SYN) flag and an ACK flag.

In this embodiment, the OVS may obtain the flag bit carried in the data packet and the flag bit carried in the data packet historically transmitted through the TCP connection. If the data packet carries an acknowledgement (ACK) flag and the historically transmitted data packet carries a synchronization (SYN) flag and an ACK flag, the OVS may determine that the data packet is a third-handshake packet, that is, determine that the connection status of the TCP connection is the steady state.

S306. The physical network interface card records the packet information in the first data flow table, and records the connection status of the TCP connection as a valid connection state in a first connection tracking table of the physical network interface card.

S307. The physical network interface card sends the data packet to a receive end of the TCP connection.

S308. The physical network interface card performs compliance detection on the data packet if the packet information matches the information in the first data flow table.

S309. If the detection fails, the physical network interface card adjusts a connection status of the TCP connection in a first connection tracking table to an invalid connection state, and discards the data packet.

In an optional implementation, the physical network interface card sets an aging time length for the connection status of the TCP connection. If a time length within which the connection status of the TCP connection is a target connection status is greater than the aging time length, the physical network interface card deletes the connection status of the TCP connection that is recorded in the first connection tracking table, and deletes the packet information that is carried in the data packet and recorded in the first data flow table, and the OVS deletes the connection status of the TCP connection that is recorded in the second connection tracking table, and deletes the packet information of the data packet that is recorded in the second data flow table.

The target connection status includes an invalid connection state or a valid connection state.

In this embodiment, the physical network interface card may set the aging time length for the connection status of the TCP connection. In this case, the physical network interface card can maintain the first data flow table and the first connection tracking table based on the aging time length for the connection status of the TCP connection, and the OVS can maintain the second data flow table and the second connection tracking table based on the aging time length for the connection status of the TCP connection, thereby improving connection tracking accuracy and saving memory space of the computer.

In an optional implementation, the target connection status includes a valid connection state, and the physical network interface card sets the aging time length for the connection status of the TCP connection based on the state machine of the TCP connection.

In this embodiment, the target connection status includes the valid connection state, and the physical network interface card sets the aging time length for the connection status of the TCP connection based on the state machine of the TCP connection, thereby improving connection tracking accuracy and saving memory space of the computer.

The physical network interface card may dynamically set the aging time length for the connection status of the TCP connection based on the state machine of the TCP connection. If it is determined, based on the state machine of the TCP connection, that the TCP connection may be used to forward the data packet, the aging time length for the connection status of the TCP connection may be set to a relatively large value (for example, 10 hours). If it is determined, based on the state machine of the TCP connection, that the TCP connection is to be closed, the aging time length for the connection status of the TCP connection may be set to a relatively small value (for example, 5 minutes).

For example, if the state machine of the TCP connection is in the steady state, the physical network interface card may determine that the TCP connection can be used to forward a data packet. If the connection status of the TCP connection is a valid connection state, the physical network interface card may set the aging time length for the connection status of the TCP connection to a relatively large value, for example, 24 hours. If the state machine of the TCP connection is in a FIN-WAIT-1 state or a FIN-WAIT-2 state, the physical network interface card may determine that the TCP connection is to be closed, and the physical network interface card may set the aging time length for the connection status of the TCP connection to a relatively small value. For example, if the state machine is in the FIN-WAIT-1 state, the aging time length may be set to 15 minutes, and if the state machine is in the FIN-WAIT-2 state, the aging time length may be set to 60 seconds.

In an optional implementation, the target connection status includes an invalid connection state, and the physical network interface card may set the aging time length for the connection status of the TCP connection based on an amount of data historically transmitted through the TCP connection or security of the TCP connection, thereby improving connection tracking accuracy and saving memory space of the computer.

For example, if the target connection status includes the invalid connection state, and the amount of data historically transmitted through the TCP connection is relatively large, for example, 10 G, the physical network interface card determines that a frequency used for the TCP connection to transmit a data packet is relatively high, and the connection status of the TCP connection may be set to a relatively small value, for example, 30 minutes, so that the connection status of the TCP connection can be deleted as quickly as possible, and the TCP connection can be tracked again. If the amount of data historically transmitted through the TCP connection is relatively small, for example, 10 M, the physical network interface card determines that a frequency used for the TCP connection to transmit a data packet is relatively low, and the connection status of the TCP connection may be set to a relatively large value, for example, 5 hours.

For another example, if the target connection status includes the invalid connection state, and the security of the TCP connection is relatively high, the connection status of the TCP connection may be set to a relatively small value, for example, 30 minutes, so that the connection status of the TCP connection can be deleted as quickly as possible, and the TCP connection can be tracked again. If the security of the TCP connection is relatively low, the connection status of the TCP connection may be set to a relatively large value, for example, 5 hours.

Figure 2:
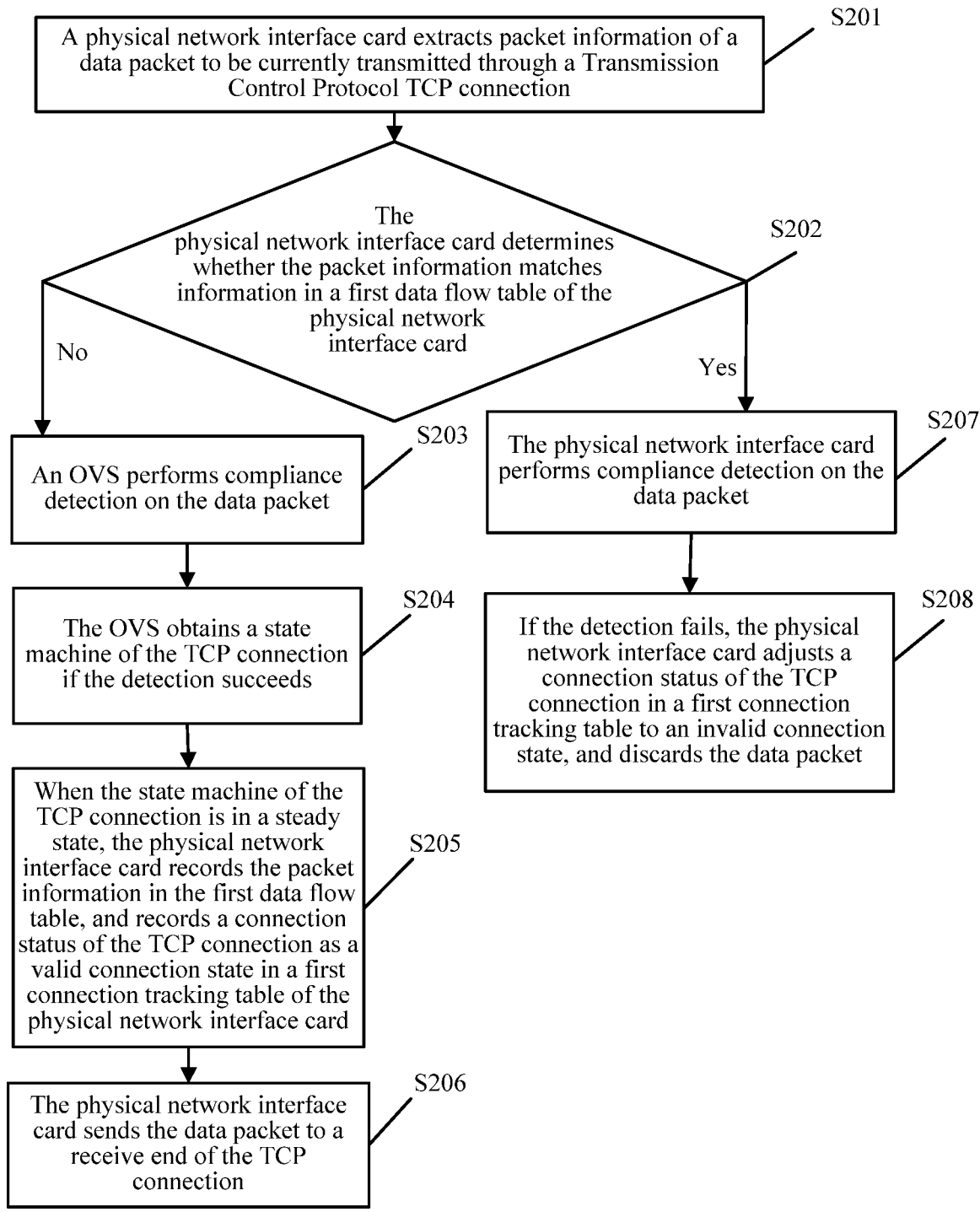
FIG. 2 is a schematic flowchart of a data processing method, in accordance with one or more embodiments.

It should be noted that for descriptions of step S301 to step S303 in this embodiment of, refer to the descriptions of step S201 to step S203 in FIG. 2, and for descriptions of step S306 to step S309 in this embodiment, refer to the descriptions of step S205 to step S309 in FIG. 2. Details are not limited to the discussed embodiments.

In this embodiment, the OVS may determine, based on the flag bit in the historically transmitted data packet and the flag bit in the to-be-transmitted data packet, whether the state machine of the TCP connection is in the steady state. If the data packet carries an acknowledgement (ACK) flag, and the historically transmitted data packet carries a synchronization (SYN) flag and an ACK flag, the OVS may determine that the connection status of the TCP connection is the steady state. When the state machine of the TCP connection is in the steady state, the physical network interface card may record the connection status of the TCP connection. Compared with a connection tracking mechanism in which a first connection tracking table is continually updated based on a change of a state machine, in some embodiments, a quantity of times that the physical network interface card updates the first connection tracking table can be reduced, thereby reducing consumption of CPU and I/O resources of the computer.

Figure 4:
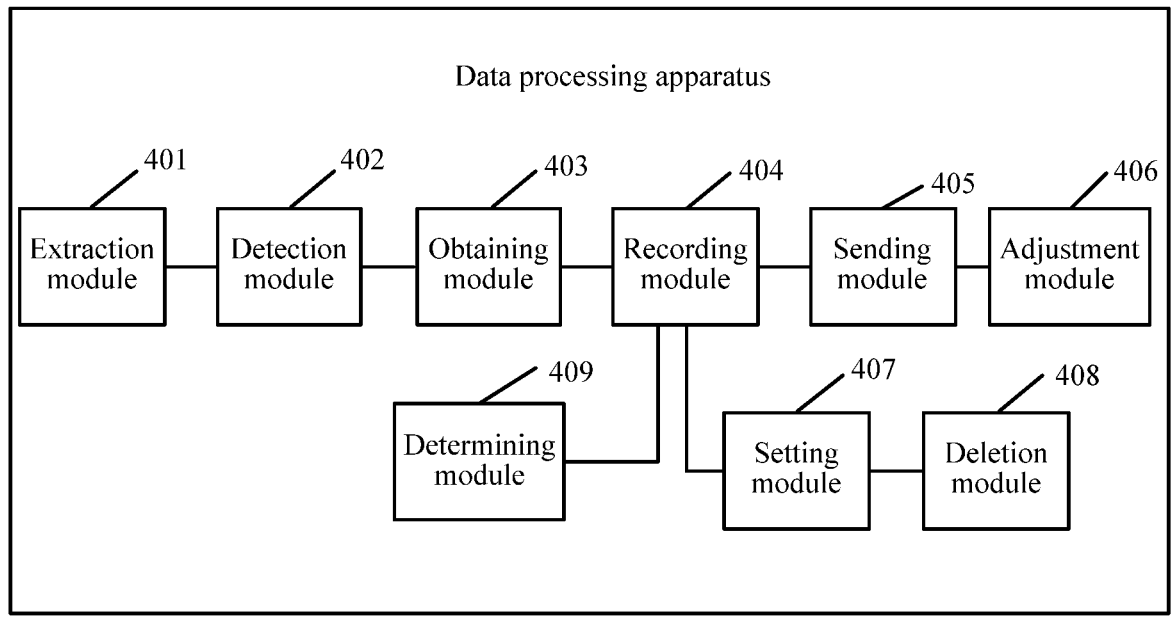
FIG. 4 is a schematic structural diagram of a data processing apparatus, in accordance with one or more embodiments.

Based on the descriptions of the data processing method, one or more embodiments provide a data processing apparatus. The apparatus is applied to a computer. The cloud apparatus includes an OVS and a physical network interface card. As shown in FIG. 4, the data processing apparatus may include an extraction module 401, a detection module 402, an obtaining module 403, a recording module 404, a sending module 405, an adjustment module 406, a setting module 407, a deletion module 408, and a determining module 409.

The extraction module 401 is configured to extract packet information of a data packet to be currently transmitted through a Transmission Control Protocol (TCP) connection.

The detection module 402 is configured to perform compliance detection on the data packet when the packet information does not match information in a first data flow table of the physical network interface card.

The obtaining module 403 is configured to obtain a state machine of the TCP connection if the detection succeeds.

The recording module 404 is configured to: when the state machine of the TCP connection is in a steady state, record the packet information in the first data flow table, and record a connection status of the TCP connection as a valid connection state in a first connection tracking table of the physical network interface card.

The sending module 405 is configured to send the data packet to a receive end of the TCP connection.

The detection module 402 is further configured to perform, by using the physical network interface card, compliance detection on the data packet if the packet information matches the information in the first data flow table.

The adjustment module 406 is configured to: if the detection fails, adjust, by using the physical network interface card, the connection status of the TCP connection in the first connection tracking table to an invalid connection state, and discard the data packet.

Optionally, the sending module 405 is further configured to send the data packet to the receive end of the TCP connection.

Optionally, the setting module 407 is configured to set the connection status of the TCP connection based on the state machine of the TCP connection.

Optionally, the recording module 404 is further configured to record the connection status of the TCP connection in a second connection tracking table of the OVS, and record the packet information in a second data flow table of the OVS.

Optionally, the setting module 407 is further configured to set an aging time length for the connection status of the TCP connection.

Optionally, the deletion module 408 is configured to: if a time length within which the connection status of the TCP connection is a target connection status is greater than the aging time length, delete the connection status of the TCP connection that is recorded in the first connection tracking table, and delete the packet information that is carried in the data packet and recorded in the first data flow table.

Optionally, the deletion module 408 is further configured to delete the connection status of the TCP connection that is recorded in the second connection tracking table, and delete the packet information of the data packet that is recorded in the second data flow table. The target connection status includes an invalid connection state or a valid connection state.

The target connection status is a valid connection state, and the setting module 407 is configured to set the aging time length for the connection status of the TCP connection based on the state machine of the TCP connection.

Optionally, the obtaining module 403 is further configured to obtain a flag bit carried in the data packet and a flag bit carried in a data packet historically transmitted through the TCP connection.

Optionally, the determining module 409 is configured to determine that the connection status of the TCP connection is a steady state if the data packet carries an acknowledgement (ACK) flag and the historically transmitted data packet carries a synchronization (SYN) flag and an ACK flag.

Figure 3:
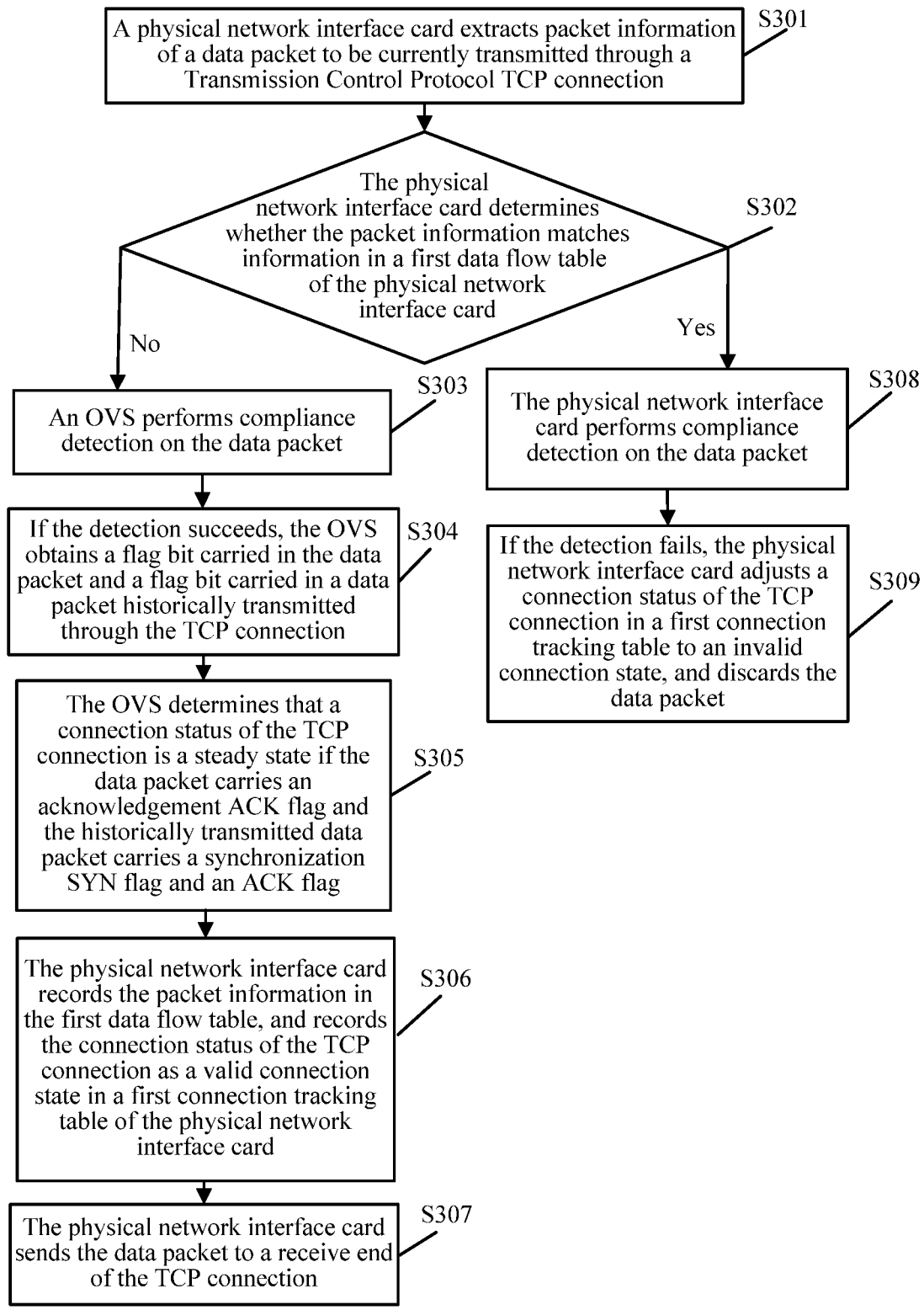
FIG. 3 is a schematic flowchart of another data processing method, in accordance with one or more embodiments.

In this embodiment, the data processing apparatus has a function of implementing corresponding steps performed by the computer in the data processing methods in the embodiments corresponding to FIG. 2 and FIG. 3. The function may be implemented by using hardware, or may be implemented by hardware by executing corresponding software. The hardware or software includes one or more modules corresponding to the foregoing function. The module may be software and/or hardware.

Based on a same concept, for principles and beneficial effects of resolving a problem by the data processing apparatus, refer to the implementations of the data processing methods in FIG. 2 and FIG. 3 and the brought beneficial effects. Therefore, for implementations of the data processing apparatus, refer to the implementations of the data processing methods in FIG. 2 and FIG. 3, and repeated parts are not described again.

Figure 5:
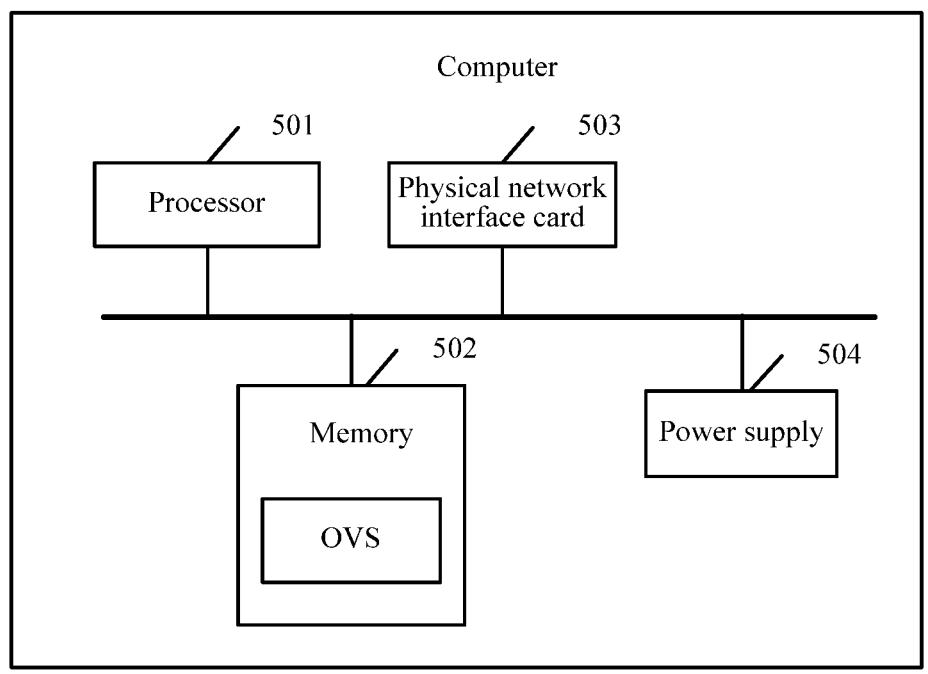
FIG. 5 is a schematic structural diagram of another computer, in accordance with one or more embodiments.

Based on the descriptions of the data processing apparatus, one or more embodiments provide a computer. As shown in FIG. 5, the computer may include a processor 501, a memory 502, a physical network interface card 503, and a power supply 504. The processor 501, the memory 502, the physical network interface card 503, and the power supply 504 are connected to each other by using a bus.

The processor 501 may be one or more central processing units (CPU). When the processor 501 is one CPU, the CPU may be a single-core CPU or a multi-core CPU.

The memory 502 includes, but is not limited to, a random access memory (RAM), a read-only memory (ROM), an (erasable programmable read-only memory (EPROM), or a portable read-only memory (compact disc read-only memory, CD-ROM). The memory 502 is configured to store an application program and data, for example, store information such as an application program, a data flow table, and a connection tracking table of an OVS.

The physical network interface card 503 includes at least one communications interface, and the communications interface is configured to communicate with another device. The communications interface may be a wired interface, a wireless interface, or a combination thereof. The wired interface may be, for example, an Ethernet interface. The Ethernet interface may be an optical interface, an electrical interface, or a combination thereof. The wireless interface may be, for example, a wireless local area network (WLAN) interface, a cellular network interface, or a combination thereof. The physical network interface card 503 is configured to receive or send a data packet through the communications interface. The physical network interface card 503 is further configured to maintain a data flow table and a connection tracking table.

The power supply 504 is configured to supply power to the computer.

The memory 502 is further configured to store a program instruction. The processor 501 may invoke the instruction stored in the memory 502, so that the OVS and the physical network interface card 503 coordinate with each other to implement the data processing method in the foregoing embodiments of this application.

Optionally, the processor 501 in this embodiment can implement functions of the extraction module 401, the detection module 402, the obtaining module 403, the recording module 404, the adjustment module 406, the setting module 407, the deletion module 408, and the determining module 409 in FIG. 4, and the physical network interface card 503 can be configured to implement a function of the sending module 405. Details are not limited to the discussed embodiments.

Optionally, the processor 501 in this embodiment can implement functions of the software environment 11 and the hardware environment 10 in FIG. 1, and the memory 502 can be configured to implement various application programs of the software environment 11 in FIG. 1. Details are not limited to the discussed embodiments.

Based on the same inventive conception, a principle of resolving a problem by the computer provided in this embodiment is similar to that in the method embodiments. Therefore, for implementation and beneficial effects of the computer, refer to the method embodiments. For brevity, details are not described herein again.

Some embodiments provide a computer-readable storage medium. The computer-readable storage medium stores a computer program. For implementations and beneficial effects of the program for resolving a problem, refer to the implementations and the beneficial effects of the data processing methods in FIG. 2 and FIG. 3. Repeated parts are not described again.

Some embodiments provide a computer program product. The computer program product includes a non-volatile computer-readable storage medium storing a computer program. When being executed, the computer program enables a computer to perform the steps in the data processing method in the embodiments corresponding to FIG. 2 and FIG. 3. For implementations and beneficial effects of the computer program product for resolving a problem, refer to the implementations and the beneficial effects of the data processing methods in FIG. 2 and FIG. 3. Repeated parts are not described again.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed.

What is claimed is:

1. A method, comprising:
extracting, by a physical network interface card of a computer, packet information of a data packet to be transmitted through a Transmission Control Protocol (TCP) connection;
performing, by an Open vSwitch (OVS) of the computer, a first compliance detection on the data packet based on a determination that the packet information does not match information in a first data flow table of the physical network interface card;
obtaining, by the OVS, a state machine of the TCP connection based on a determination that the first compliance detection is successful;
in response to a determination that the state machine of the TCP connect is in a non-steady state, setting, by the OVS, a connection status of the TCP connection based on the state machine of the TCP connection;
recording, by the OVS, the connection status of the TCP connection in an OVS-associated connection tracking table;
detecting the state machine of the TCP connection is in a steady state and recording, by the physical network interface card based on the state machine of the TCP connection being in the steady state, the packet information in the first data flow table;
recording, by the physical network interface card based on the determination that the state machine of the TCP connection is in the steady state, the connection status of the TCP connection as a valid connection state in a first connection tracking table of the physical network interface card;
sending, by the physical network interface card, the data packet to a receiving end of the TCP connection;
performing, by the physical network interface card, a second compliance detection on the data packet based on a determination that the packet information matches the information in the first data flow table;
adjusting, by the physical network interface card based on a determination that the second compliance detection fails, the connection status of the TCP connection in the first connection tracking table to an invalid connection state; and discarding the data packet based on the determination that the second compliance detection fails.

2. The method according to claim 1, wherein the OVS-associated connection tracking table is a second connection tracking table of the OVS; and the method further comprises:
recording, by the OVS, the packet information in a second data flow table of the OVS.

3. The method according to claim 2, further comprising:
setting, by the physical network interface card, an aging time length for the connection status of the TCP connection; and
based on a determination that a time length within which the connection status of the TCP connection is in a target connection status is greater than the aging time length:
deleting, by the physical network interface card, the connection status of the TCP connection that is recorded in the first connection tracking table;
deleting, by the physical network interface card, the packet information that is carried in the data packet and recorded in the first data flow table;
deleting, by the OVS, the connection status of the TCP connection that is recorded in the second connection tracking table; and
deleting, by the OVS, the packet information that is carried in the data packet and recorded in the second data flow table,
wherein the target connection status comprises an invalid connection state or a valid connection state.

4. The method according to claim 3, wherein the target connection status is the valid connection state, and setting the aging time length for the connection status of the TCP connection comprises:
setting the aging time length for the connection status of the TCP connection based on the state machine of the TCP connection.

5. The method according to claim 1, wherein the state machine of the TCP connection is in the steady state, and obtaining the state machine of the TCP connection comprises:
obtaining a flag bit carried in the data packet and a flag bit carried in a past data packet historically transmitted through the TCP connection; and
determining, by the OVS, that the connection status of the TCP connection is the steady state if the data packet carries an acknowledgement (ACK) flag and the past data packet carries a synchronization (SYN) flag and the ACK flag.

6. The method according to claim 1, wherein the first compliance detection is used to detect whether the data packet satisfies a first specified condition corresponding to the first compliance detection, and the second compliance detection is used to detect whether the data packet satisfies a second specified condition corresponding to the second compliance detection.

7. The method according to claim 6, wherein the first specified condition is identical to the second specified condition.

8. A computer, comprising:
at least one processor;
a memory having computer-readable instructions stored thereon that, when executed by the at least one processor, causes the computer to:
extract packet information of a data packet to be transmitted through a Transmission Control Protocol (TCP) connection;
perform a first compliance detection on the data packet based on a determination that the packet information does not match information in a first data flow table of a physical network interface card;
obtain a state machine of the TCP connection based on a determination that the first compliance detection is successful;
in response to a determination that the state machine of the TCP connect is in a non-steady state, set a connection status of the TCP connection based on the state machine of the TCP connection;
record the connection status of the TCP connection in a non-steady state connection tracking table;
detect the state machine of the TCP connection is in a steady state and record, by way of the physical network interface card based on the state machine of the TCP connection being in the steady state, the packet information in the first data flow table;
record, by way by way of the physical network interface card based on the determination that the state machine of the TCP connection is in the steady state, the connection status of the TCP connection as a valid connection state in a first connection tracking table of the physical network interface card;
send the data packet to a receiving end of the TCP connection; and
perform a second compliance detection on the data packet based on a determination that the packet information matches the information in the first data flow table;
adjust, by way of the physical network interface card based on a determination that the second compliance detection fails, the connection status of the TCP connection in the first connection tracking table to an invalid connection state; and
discard the data packet based on the determination that the second compliance detection fails.

9. The computer according to claim 8, wherein the non-steady state connection tracking table is a second connection tracking table, and the computer is further caused to:
record the packet information in a second data flow table.

10. The computer according to claim 9, wherein the computer is further caused to:
set an aging time length for the connection status of the TCP connection; and
based on a determination that a time length within which the connection status of the TCP connection is in a target connection status is greater than the aging time length;
delete the connection status of the TCP connection that is recorded in the first connection tracking table;
delete the packet information that is carried in the data packet and recorded in the first data flow table;
delete the connection status of the TCP connection that is recorded in the second connection tracking table; and
delete the packet information that is carried in the data packet and recorded in the second data flow table,
wherein the target connection status comprises an invalid connection state or a valid connection state.

11. The computer according to claim 10, wherein the target connection status is the valid connection state and the computer is caused to set the aging time length for the connection status of the TCP connection based on the state machine of the TCP connection.

12. The computer according to claim 8, wherein the computer is further caused to:

obtain a flag bit carried in the data packet and a flag bit carried in a past data packet historically transmitted through the TCP connection; and
determine that the connection status of the TCP connection is the steady state if the data packet carries an acknowledgement (ACK) flag and the past data packet carries a synchronization (SYN) flag and the ACK flag.

13. The computer according to claim 8, wherein the first compliance detection detects whether the data packet satisfies a first specified condition corresponding to the first compliance detection, and the second compliance detection detects whether the data packet satisfies a second specified condition corresponding to the second compliance detection.

14. The computer according to claim 13, wherein the first specified condition is identical to the second specified condition.

15. A non-transitory computer storage medium having computer-readable instructions stored thereon that, when executed by at least one processor, causes an apparatus to:
extract packet information of a data packet to be transmitted through a Transmission Control Protocol (TCP) connection;
perform a first compliance detection on the data packet based on a determination that the packet information does not match information in a first data flow table of a physical network interface card;
obtain a state machine of the TCP connection based on a determination that the first compliance detection is successful;
in response to a determination that the state machine of the TCP connect is in a non-steady state, set a connection status of the TCP connection based on the state machine of the TCP connection;
record the connection status of the TCP connection in a non-steady state connection tracking table;
detect the state machine of the TCP connection is in a steady state and record, by way of the physical network interface card based on the state machine of the TCP connection being in the steady state, the packet information in the first data flow table;
record, by way by way of the physical network interface card based on the determination that the state machine of the TCP connection is in the steady state, the connection status of the TCP connection as a valid connection state in a first connection tracking table of the physical network interface card;
send the data packet to a receiving end of the TCP connection; and
perform a second compliance detection on the data packet based on a determination that the packet information matches the information in the first data flow table;
adjust, by way of the physical network interface card based on a determination that the second compliance detection fails, the connection status of the TCP connection in the first connection tracking table to an invalid connection state; and
discard the data packet based on the determination that the second compliance detection fails.

16. The non-transitory computer storage medium according to claim 15, wherein the non-steady state connection tracking table is a second connection tracking table, and the apparatus is further caused to:
record the packet information in a second data flow table.

17. The non-transitory computer storage medium according to claim 16, wherein the apparatus is further caused to:
set an aging time length for the connection status of the TCP connection; and
based on a determination that a time length within which the connection status of the TCP connection is in a target connection status is greater than the aging time length;
delete the connection status of the TCP connection that is recorded in the first connection tracking table;
delete the packet information that is carried in the data packet and recorded in the first data flow table;
delete the connection status of the TCP connection that is recorded in the second connection tracking table; and
delete the packet information that is carried in the data packet and recorded in the second data flow table,
wherein the target connection status comprises an invalid connection state or a valid connection state.

18. The non-transitory computer storage medium according to claim 17, wherein the target connection status is the valid connection state and the apparatus is caused to set the aging time length for the connection status of the TCP connection based on the state machine of the TCP connection.

19. The non-transitory computer storage medium according to claim 15, wherein the apparatus is further caused to:
obtain a flag bit carried in the data packet and a flag bit carried in a past data packet historically transmitted through the TCP connection; and
determine that the connection status of the TCP connection is the steady state if the data packet carries an acknowledgement (ACK) flag and the past data packet carries a synchronization (SYN) flag and the ACK flag.

20. The non-transitory computer storage medium according to claim 15, wherein the first compliance detection detects whether the data packet satisfies a first specified condition corresponding to the first compliance detection, and the second compliance detection detects whether the data packet satisfies a second specified condition corresponding to the second compliance detection, and the first specified condition is identical to the second specified condition.

* * * * *